(12) United States Patent
Mustonen

(10) Patent No.: US 9,608,552 B2
(45) Date of Patent: Mar. 28, 2017

(54) FREQUENCY CONVERTER PARAMETER OPTIMIZATION

(71) Applicant: ABB Technology Oy, Helsinki (FI)

(72) Inventor: Matti Mustonen, Espoo (FI)

(73) Assignee: ABB Technology OY, Helsinki (FI)

( * ) Notice: Subject to any disclaimer, the term of this patent is extended or adjusted under 35 U.S.C. 154(b) by 6 days.

(21) Appl. No.: 14/705,660

(22) Filed: May 6, 2015

(65) Prior Publication Data

US 2015/0326164 A1 Nov. 12, 2015

(30) Foreign Application Priority Data

May 6, 2014 (EP) .................................... 14167090

(51) Int. Cl.
*H02P 23/00* (2016.01)
*H02P 25/00* (2006.01)
(Continued)

(52) U.S. Cl.
CPC .......... *H02P 23/14* (2013.01); *H02P 23/0077* (2013.01); *H02P 27/04* (2013.01)

(58) Field of Classification Search
CPC .......... H02P 21/16; H02P 21/24; H02P 23/14; H02P 1/029; H02P 21/0096; H02P 21/12;
(Continued)

(56) References Cited

U.S. PATENT DOCUMENTS 3,996,452 A * 12/1976 Schulze .................. B02C 25/00
241/34
4,392,100 A * 7/1983 Stanton ............... H02P 23/0027
318/803

(Continued)

FOREIGN PATENT DOCUMENTS

EP 1 713 173 A2 10/2006
EP 2 555 420 A1 2/2013

OTHER PUBLICATIONS

European Search Report for EP 14 16 7090 dated Dec. 2, 2014.
(Continued)

*Primary Examiner* — Paul Ip
(74) *Attorney, Agent, or Firm* — Taft Stettinius & Hollister LLP

(57) ABSTRACT

A method is provided for optimizing a parameter used in a frequency converter connected to an electrical rotating machine. The method includes identifying a parameter of the machine using electrical quantities, the identified parameter being used in the frequency converter and being identified in a first operating point, providing an electro-mechanical model of the rotating electrical machine to the frequency converter, and calculating when a processor capacity of the frequency converter is available, (i) a state of the rotating electrical machine in the first operating point using a finite element method with the electro-mechanical model of the rotating electrical machine, (ii) a state of the rotating electrical machine in a selected operating point using the finite element method with the electro-mechanical model, correcting the calculated state of the rotating electrical machine, and calculating, from the corrected state, parameter(s) of the electrical machine to be used in the frequency converter.

19 Claims, 2 Drawing Sheets

(51) Int. Cl.
*H02P 23/14* (2006.01)
*H02P 27/04* (2016.01)

(58) Field of Classification Search
CPC .... H02P 21/141; H02P 2207/01; H02P 27/06; H02P 21/18; H02P 21/34; H02P 23/0077; H02P 27/048; H02P 1/44; H02P 21/0003
USPC ........................................ 318/727, 803, 807
See application file for complete search history.

(56) References Cited

U.S. PATENT DOCUMENTS

| | | | | |
|---|---|---|---|---|
| 5,841,264 | A * | 11/1998 | Caen | ................ H02P 27/02 318/727 |
| 7,023,166 | B1 * | 4/2006 | Kohen | ................ H02P 27/16 318/727 |
| 2003/0155885 | A1 | 8/2003 | Zaremba et al. | |
| 2006/0232237 | A1 | 10/2006 | Jadot et al. | |
| 2014/0145655 | A1 | 5/2014 | Peretti et al. | |

OTHER PUBLICATIONS

A. Knight et al., "A comparison between finite element techniques when modelling single phase line-start permanent magnet motors", Electrical Machines and Drives, Ninth International Conference, Sep. 1, 1999, pp. 351-355.
G. More et al., "A Software Interrupt Priority Scheme for HCS12 Microcontrollers Application Note", retreived from the internet: http://cache.freescale.com/files/microcontrollers/doc/app_note/AN2617.pdf. (12 pages), Feb. 2004.
A-K Repo et al., "Dynamic electromagnetic torque model and parameter estimation for a deep-bar induction machine", IET Electric Power Applications, May 1, 2008, pp. 183-192, vol. 2 No. 3.

\* cited by examiner

FREQUENCY CONVERTER PARAMETER OPTIMIZATION

RELATED APPLICATION

This application claims priority to European Application 14167090.1 filed in Europe on May 6, 2014. The entire content of this application is hereby incorporated by reference in its entirety.

FIELD

The present disclosure relates to identifying parameters of a rotating electric machine, and more particularly to identifying parameters during use of such a machine using a frequency converter.

BACKGROUND INFORMATION

Frequency converters can be used in a known manner to control the rotation of a rotating electrical machine. The control of the machine, such as a motor or a generator, is implemented by controlling the currents of the machine such that desired operation is achieved.

As the control of motor is carried out by the frequency converter that outputs voltage pulses to the motor, the parameters of the motor should be known accurately so that desired currents can be achieved. Such parameters can be, for example, inductances and resistances of the machine. The accuracy of inductances of a machine affects the calculation of fluxes and torque. Some parameters can be fed manually to the frequency converter when the drive is taken into use. Some frequency converters include an identification run, in which the frequency converter identifies automatically the parameters of the machine by feeding test pulses to the machine and calculating from the responses to those test pulses parameters of the machine.

The parameters of the machine depend on various aspects. For example, the temperature of the machine and saturation effects can change the properties of the machine such that values of identified parameters can change during the operation of the machine depending on the operating point.

Further, when the operating point of the machine is out of the typical range of operating points, the parameters can change considerably. Such operating points of the machine are not taken into account in parameter identification and as the parameters used in the control structure of the frequency converter do not match with the actual parameters, the control of the machine is not optimal.

It is known in the art of frequency converters to adapt or tune the various parameters used in the control system for making the control more accurate. One such known method is the use of signal injection. In signal injection, a high-frequency signal is injected to the output of the frequency converter. The response obtained from the injected signal is detected, and certain corrections can be made to the parameters based on the response. Another known identification technique is model reference adaptive system (MRAS) in which on the basis of a known model, a parameter of another model is adapted.

The tuning of parameters initiates the use of the actual control system, which impedes the controller operation. The controller needs to be tuned to take the injected signal into account. Further, known tuning systems obtain the correct value of a certain parameter only at the current operating point. Thus, the parameters cannot be identified in or at a desired operating point.

SUMMARY

An exemplary embodiment of the present disclosure provides a method of optimizing a parameter used in a frequency converter connected to an electrical rotating machine. The method includes identifying a parameter of the machine using electrical quantities, the identified parameter being used in the frequency converter and being identified in a first operating point. The method includes providing, to the frequency converter, an electro-mechanical model of the rotating electrical machine, where the electro-mechanical model includes a geometry of the machine and information of the construction material of the machine. The method includes calculating, in the frequency converter, when a processor capacity of the frequency converter is available, a state of the rotating electrical machine in the first operating point using a finite element method with the electro-mechanical model of the rotating electrical machine. The method includes calculating, in the frequency converter, when the processor capacity of the frequency converter is available, a state of the rotating electrical machine in a selected operating point using the finite element method with the electro-mechanical model of the rotating electrical machine. The method includes correcting the calculated state of the rotating electrical machine of a selected operating point using the identified parameter and the calculated state in the first operating point. The method also includes calculating from the corrected state of the rotating electrical machine one or more parameters of the electrical machine to be used in the frequency converter.

An exemplary embodiment of the present disclosure provides a frequency converter configured to optimize a parameter used in a frequency converter connected to an electrical rotating machine. The frequency converter includes means for identifying a parameter of the machine using electrical quantities, the identified parameter being used in the frequency converter and being identified in first operating point. The frequency converter includes means for providing to the frequency converter an electro-mechanical model of the rotating electrical machine, the electro-mechanical model including a geometry of the machine and information of the construction material of the machine. The frequency converter includes means for calculating, in the frequency converter, when the processor capacity of the frequency converter is available, a state of the rotating electrical machine in the first operating point using a finite element method with the electro-mechanical model of the rotating electrical machine. The frequency converter includes means for calculating, in the frequency converter, when the processor capacity of the frequency converter is available, a state of the rotating electrical machine in a selected operating point using the finite element method with the electro-mechanical model of the rotating electrical machine. The frequency converter includes means for correcting the calculated state of the rotating electrical machine of a selected operating point using the identified parameter and the calculated state in the first operating point. The frequency converter includes means for calculating, from the corrected state of the rotating electrical machine, at least one parameter of the electrical machine to be used in the frequency converter. Each of the described means includes a processor and a memory storing instructions that, when executed by the processor, cause the frequency converter to perform the described functions.

An exemplary embodiment of the present disclosure provides a frequency converter configured to optimize a parameter used in a frequency converter connected to an electrical rotating machine. The frequency converter includes means for identifying a parameter of the machine using electrical quantities, the identified parameter being used in the frequency converter and being identified in first operating point. The frequency converter includes means for providing to the frequency converter an electro-mechanical model of the rotating electrical machine, the electro-mechanical model including a geometry of the machine and information of the construction material of the machine. The frequency converter includes means for calculating, in the frequency converter, when the processor capacity of the frequency converter is available, a state of the rotating electrical machine in the first operating point using a finite element method with the electro-mechanical model of the rotating electrical machine. The frequency converter includes means for calculating, in the frequency converter, when the processor capacity of the frequency converter is available, a state of the rotating electrical machine in a selected operating point using the finite element method with the electro-mechanical model of the rotating electrical machine. The frequency converter includes means for correcting the calculated state of the rotating electrical machine of a selected operating point using the identified parameter and the calculated state in the first operating point. The frequency converter includes means for calculating, from the corrected state of the rotating electrical machine, at least one parameter of the electrical machine to be used in the frequency converter. Each of the described means includes a processor and a memory storing instructions that, when executed by the processor, cause the frequency converter to perform the described functions.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
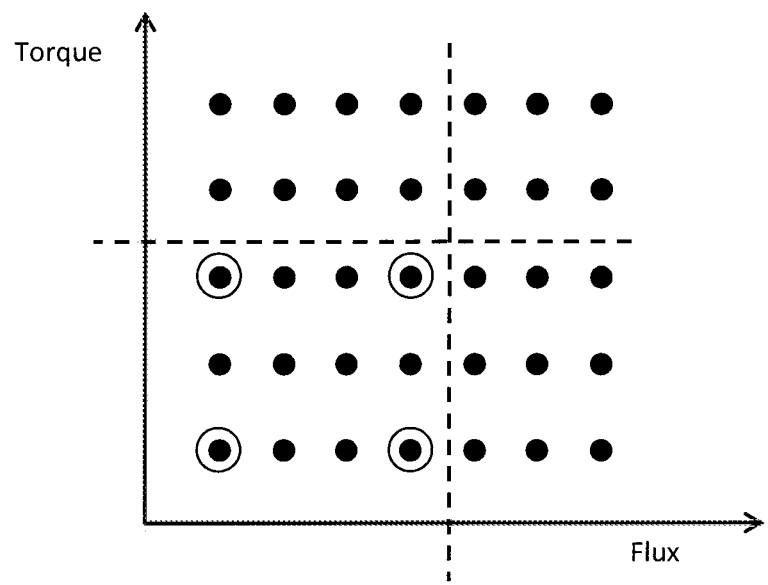
FIG. 1 shows an example of calculated operation points, according to an exemplary embodiment of the present disclosure.

Exemplary embodiments of the present disclosure provide a method of optimizing a parameter used in a frequency converter connected to an electrical rotating machine, as well as a frequency converter for implementing the method. The method and frequency converter of the present disclosure overcome the drawbacks associated with known techniques, as described above.

According to an exemplary embodiment, the frequency converter of the present disclosure includes a non-transitory computer-readable recording medium having a computer program and/or computer-readable instructions tangibly recorded thereon. The non-transitory computer-readable recording medium may be a nonvolatile memory such as a read only memory (ROM), hard disk drive, flash memory, optical memory, etc. The frequency converter includes at least one processor (e.g., application-specific or general purpose) which is configured to carry out the operatives functions of the frequency converter as described herein by executing the computer program and/or computer-readable instructions tangibly recorded on the non-transitory computer-readable recording medium. According to an exemplary embodiment, the "means" elements of the frequency converter of the present disclosure are structurally embodied by the above-described processor executing the program and/or instructions recorded on the non-transitory computer-readable recording medium. The non-transitory computer-readable recording medium may be referred to as a "memory" herein. The memory is accessible by the processor of the frequency converter.

Exemplary embodiments of the present disclosure are based on the concept of using the processing capacity of the frequency converter to calculate parameter values of the machine to which the frequency converter is connected, in certain operating points using a finite element method. As used herein, the term "processor capacity" or "processing capacity" may generally indicate or refer to a current state of the processor of the frequency converter in terms of the amount of processing it is performing. Available processor capacity refers to when the processing capabilities of the processor of the frequency converter are available at that time, for example, when the processor is not entirely directed to performing another function of the frequency converter, and in other words, the processor is in a state in which the processor can perform a predetermined function or operation of the frequency converter. Moreover, the processor may be considered to be at "full processor capacity" when it is directed to performing another function and the resources of the processor cannot be diverted, such as when control of the drive is being implemented, for example. As used herein, the term "calculation capacity" refers to when the processor has sufficient capacity to perform calculation operations. It is to be understood that the calculation capacity of the frequency converter according to the present disclosure occurs during the normal operation of the frequency converter. If the actual operation of the frequency converter does not initiate full processor capacity for the control of the drive, the then available capacity of the processor can be used for complex calculations that are not relating to the current operating point.

By using a finite element method based on an accurate model on the mechanics of the motor, the parameters of the machine and/or the state of the machine can be calculated accurately. The model of the mechanics includes, for example, geometry, materials used and winding construction.

An advantage of the present disclosure is that the calculation of the parameters or the state of the machine does not disturb the operation of the controller of the frequency converter. Further, the calculated operating point can be selected freely. According to an exemplary embodiment, the calculated operating points are user-specified or selected on the basis of the use of the frequency converter. The selection of calculated operating points provides directly usable data on the basis of which the operation of the frequency converter can be improved.

In machine design, it is known to use FEM (Finite Element Method) calculations and software. These calculations require, as starting information, the geometry and materials of the machine. Using such calculation the magnetic behavior of the machine can be calculated accurately.

In accordance with an exemplary embodiment of the present disclosure, one or more of the machine parameters can be identified first using an identification procedure of quantities which may be calculated or are known beforehand. Such a procedure may include supplying a known voltage pulse or sequence of voltage pulses to the machine using the frequency converter. After the pulses can be supplied or during the supply of the pulses the responses to these pulses can be detected. The responses can be currents or voltages, and a parameter value can be calculated from the supplied voltage and the responses.

These identification tests can be carried out during the commissioning of the drive, for example, when the combination of frequency converter and the electric machine is taken into use for the first time. The identification procedure collects the parameters for certain operating point or points only. For example, the identification procedure can provide an estimate for main inductance of an induction machine at the nominal speed and flux level without load. Thus, the value of inductance is then used in the controller of the frequency converter regardless of the actual current of the machine.

In the present disclosure, a parameter of the machine is identified in a known manner using the voltages and currents produced by the frequency converter that is connected to the machine. The parameter is identified in a known operating point. The identified parameter is further stored in the frequency converter and it is used in the controller structure in the frequency converter.

According to an exemplary embodiment of the present disclosure, a mechanical model representing the rotating electrical machine is provided to the frequency converter. The mechanical model includes accurate geometrical dimensions of the machine and information of the construction materials of the machine. This information is initiated for calculation of the state of the machine using a finite element method. As in any finite element calculations, the accuracy of the mechanical model results in more accurate information of the state of the machine.

Further, in the method, the frequency converter calculates the state of the rotating electrical machine in the first operating state. In the calculation, the processor capacity of the processor of the frequency converter is used and the calculation is done with a finite element method.

A primary function or operation of the processor of a frequency converter relates to controlling the electrical machine in a desired manner. That is, the processor reads possible measurements and input commands, for example, and executes the control scheme. When the entire processor capacity of the processor is not initiated for the control, the processor can run other tasks in the background. If an interrupt occurs again or a high priority task gets activated, the background task is interrupted, and the processor is taken into its primary operation. The FEM calculation is run as a background task when processing capacity is available.

As the FEM calculation is calculated at the same operating point as the common parameter identification, the obtained results should be equal. As FEM calculation produces the electro-magnetic state of the machine, the FEM calculation cannot produce parameter values directly. The electro-magnetic state of the machine provides information on the magnetic fluxes flowing in the core of the machine. The magnetic fluxes and flux densities can be further used in determining inductances as the currents of the machine can be also known.

In an example in which the main inductance of an induction machine is first identified in an operating point with nominal speed and flux without load, the FEM method is also applied for calculating the main inductance in the same operating point in the above-described manner.

When the FEM calculation in the first operating point is completed, the calculation can proceed to other points of interest. The FEM calculation is calculated as above, but with different starting values, i.e. in another operating point of the machine. The other operating point can be, for example, the main inductance with twice the nominal torque.

The first FEM calculation is used for calibrating the results obtained from the FEM calculation. The identified value is compared with the calculated value, and the value of the parameter calculated with the FEM method is corrected such that it corresponds with (e.g., is equal to) the identified value as the identified value is more accurate than the calculated value. The calculated FEM values can be corrected by changing the values with the amount that corresponds to the difference between the identified value and calculated value. That is, if value xid is obtained with identification and value xFEM is obtained with FEM method in the same operating point, then each value xFEM, i obtained with FEM method is corrected by the amount corresponding to the difference between the values xid and xFEM.

The frequency converter can have a FEM calculation program installed in the non-transitory computer-readable recording medium as described above, and once data of a machine is loaded to the frequency converter, the FEM calculation can be started. If the user of the frequency converter does not specify any particular points of interest for the calculation, the frequency converter can select the calculated point and parameter by itself based on set criteria. The criteria is, for example, set such that if it is noticed that the frequency converter controls the motor mainly in the same operating point, the parameters of such point can be estimated, especially if the operating point is not included in the identification run. For example, the frequency converter of the present disclosure can be in a pumping process which repeatedly operates in a few operating points. The frequency converter can register such use, and if the operating points are not such points in which the identification run is made, the frequency converter can start FEM calculation in these operating points for obtaining exact information of the state of the machine and thereby optimizing the parameters used in the controller structure.

Other points of interest in which the FEM calculation can be processed can be the maximum points of operation, for example. That is to say that the FEM calculation is carried out in operating points in highest allowable values of current and/or torque, for example. Calculations in such operating points can be of interest as the saturation of the machine is highest with the highest currents.

One possible calculation scheme is to form a matrix of calculated points. FIG. 1 shows operating points of torque versus flux. In each operating point FEM calculation is processed and each operating point provides a value of inductance, for example. The inductance, after correcting with the calibration measurement, can then be used in the control structure of the motor when operation is in the operating point or near the operating point. Similar matrixes can be formed with different operating point parameters. The user can give limit values inside which the calculation is processed. If such limits are given, the calculation is first processed in the corner points of such limits. With reference to FIG. 1, examples of such limits can be shown in dashed lines. The limit values limit the calculation to fluxes and torques having values lower than the limit values. The corner points from which the calculation is starter can be further circled.

Figure 2:
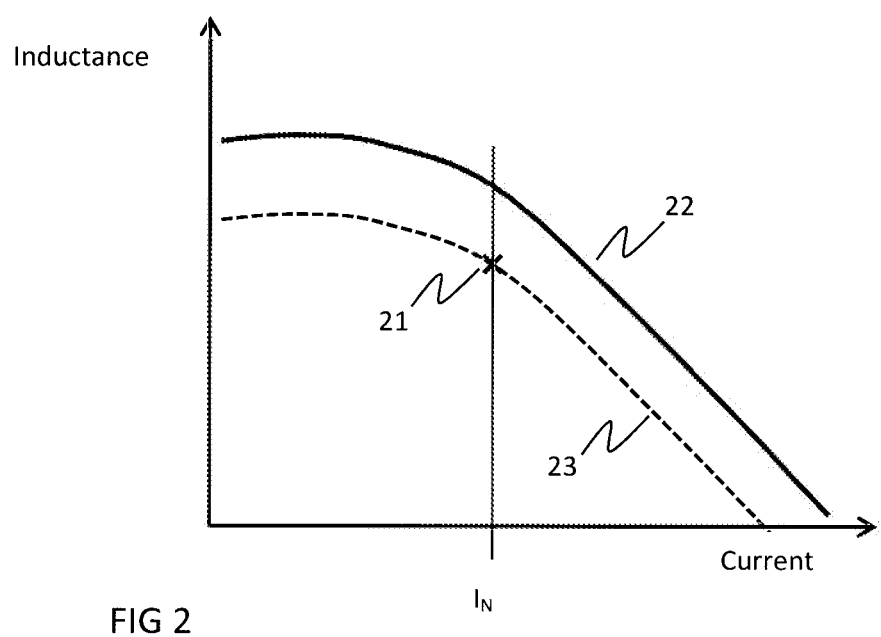
FIG. 2 shows an example of calibration of the calculated values, according to an exemplary embodiment of the present disclosure.

FIG. 2 illustrates the relationship between an identified parameter and the calculated set of parameters. In the example of FIG. 2, a value of inductance 21 is identified using a known identification method with a known or calculated value of current IN. The inductance is also calculated with FEM-calculation with different values of current. These values can be approximated by curve 22. The FEM calculation produces values of inductance with different currents and provides the shape for the inductance curve. As the identified value of inductance is accurate, another curve 23 having the shape of curve 22 is produced. This calibrated curve 23 has the identified value of the inductance with the known current IN and the shape of the curve 22 from the FEM calculation.

Figure 3:
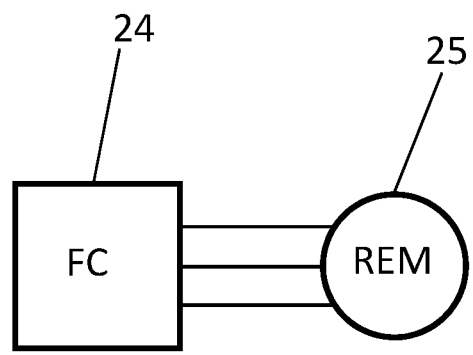
FIG. 3 shows an example of a frequency converter connected to a rotating electrical machine, according to an exemplary embodiment of the present disclosure.

In different types of electrical machines, different parameters can be of interest. For example, in some machines, such as in synchronous reluctance motors and synchronous salient pole motors, the inductance is dependent on the rotor angle, and the effect of cross saturation to the direct axis and quadrature axis inductances can be of interest. The FEM calculation can be used to calculate the fluxes as a function of stator current, torque and angular speed of the motor, for example. As the frequency converter 24 is connected to the rotating electrical machine 25 (shown in FIG. 3), the machine 25 is also controlled using the same. As is known, a frequency converter produces voltage or current pulses to the machine for controlling the machine in a desired manner. In connection with induction motors, transient inductances and magnetizing inductances can be possible calculated parameters. Further, in connection with synchronous machines, the parameters of interest can be the transient inductances and synchronous inductances both in direct axis and quadrature axis directions.

The mechanical model of the rotating electrical machine can be fed to the frequency converter by the user of the frequency converter. If the frequency converter and the rotating electrical machine, such as motor, can be a single package, the frequency converter can have the mechanical model stored as it leaves from the manufacturer. With a single package, it is referred to a so-called integral motor in which the frequency converter and motor can be packed together to form a single unit. Further, the frequency converter can be provided with means that fetch or download the mechanical model from a database. For such purpose, the exact type or model of the motor has to be known and fed into the frequency converter. After the type and model of the motor is entered in the frequency converter, the frequency converter can connect to an outside database to check if a mechanical model of the motor is available. If the mechanical model is found, the frequency converter can fetch it for the FEM calculation.

As mentioned above, the FEM calculation of the present disclosure is carried out in the processor of the frequency converter with low priority. When the processor capacity is initiated for other higher priority tasks, the calculation is interrupted and the calculated values can be stored in the memory accessible by the processor. When interrupted FEM calculation is started again, the calculation can be started from the point in which the interruption was encountered without the need of starting the calculation from the beginning. When a FEM calculation is finished and possible calibration of the result is made, the calculated parameter can be stored in memory accessible by the processor such that the processor can employ the obtained result in the actual control operation. The calculated points can be stored in a nonvolatile memory so that the calculated data is available after possible power-down situations.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of optimizing a parameter used in a frequency converter connected to an electrical rotating machine, the method comprising:
   identifying a parameter of the machine using electrical quantities, the identified parameter being used in the frequency converter and being identified in a first operating point;
   providing, to the frequency converter, an electro-mechanical model of the rotating electrical machine, the electro-mechanical model including a geometry of the machine and information of the construction material of the machine;
   calculating, in the frequency converter, when a processor capacity of the frequency converter is available, a state of the rotating electrical machine in the first operating point using a finite element method with the electro-mechanical model of the rotating electrical machine;
   calculating, in the frequency converter, when the processor capacity of the frequency converter is available, a state of the rotating electrical machine in a selected operating point using the finite element method with the electro-mechanical model of the rotating electrical machine;
   correcting the calculated state of the rotating electrical machine of a selected operating point using the identified parameter and the calculated state in the first operating point;
   calculating from the corrected state of the rotating electrical machine one or more parameters of the electrical machine to be used in the frequency converter; and
   controlling the operation of the frequency converter to drive the electrical rotating machine with the calculated one or more parameters.

2. A method according to claim 1, wherein the first operating point is a nominal operating point of the electrical machine.

3. A method according to claim 2, comprising:
   selecting an operating point in which the finite element calculation is carried out to be the highest allowable operation point.

4. A method according to claim 2, wherein the identified parameter is an inductance of the rotating electrical machine.

5. A method according to claim 1, comprising:
   interrupting the calculation of a state of the rotating electrical machine when the processor of the frequency converter is initiated for operations with higher priority;
   storing the current state of calculation in a memory accessible by the processor; and
   continuing the calculation when processor capacity is again available by reading the stored state of calculation from the memory.

6. A method according to claim 5, comprising:
   selecting an operating point in which the finite element calculation is carried out to be the highest allowable operation point.

7. A method according to claim 5, wherein the identified parameter is an inductance of the rotating electrical machine.

8. A method according to claim 1, comprising:
calculating further states of the rotating electrical machine in multiple operating points;
calculating at least one parameter of the electrical machine from the calculated states of the rotating electrical machine;
storing the operating points and corresponding at least one parameter; and
using the at least one parameter in the frequency converter when the operating point of the frequency converter corresponds to the stored operating point.

9. A method according to claim 8, comprising:
selecting an operating point in which the finite element calculation is carried out to be the highest allowable operation point.

10. A method according to claim 8, wherein the identified parameter is an inductance of the rotating electrical machine.

11. A method according to claim 1, comprising:
selecting the operating point in which the finite element calculation is carried out based on the use of the frequency converter for obtaining at least one parameter in an operating point used frequently.

12. A method according to claim 11, wherein the identified parameter is an inductance of the rotating electrical machine.

13. A method according to claim 1, comprising:
selecting an operating point in which the finite element calculation is carried out to be the highest allowable operation point.

14. A method according to claim 13, wherein the identified parameter is an inductance of the rotating electrical machine.

15. A method according to claim 1, wherein the identified parameter is an inductance of the rotating electrical machine.

16. A method according to claim 1, wherein the state of the rotating electrical machine is calculated in operation points which are fixed with values of at least one of current, flux, voltage and torque.

17. A method according to claim 1, wherein the rotating electrical machine is a motor.

18. A frequency converter configured to optimize a parameter used in a frequency converter connected to an electrical rotating machine, the frequency converter comprising:
means for identifying a parameter of the machine using electrical quantities, the identified parameter being used in the frequency converter and being identified in first operating point;
means for providing to the frequency converter an electro-mechanical model of the rotating electrical machine, the electro-mechanical model including a geometry of the machine and information of the construction material of the machine;
means for calculating, in the frequency converter, when a processor capacity of the frequency converter is available, a state of the rotating electrical machine in the first operating point using a finite element method with the electro-mechanical model of the rotating electrical machine;
means for calculating, in the frequency converter, when the processor capacity of the frequency converter is available, a state of the rotating electrical machine in a selected operating point using the finite element method with the electro-mechanical model of the rotating electrical machine;
means for correcting the calculated state of the rotating electrical machine of a selected operating point using the identified parameter and the calculated state in the first operating point;
means for calculating, from the corrected state of the rotating electrical machine, at least one parameter of the electrical machine to be used in the frequency converter; and
means for controlling the operation of the frequency converter to drive the electrical rotating machine with the calculated at least one parameter.

19. A frequency converter configured to control an electrical rotating machine connected thereto, the frequency converter comprising a processor and a memory storing instructions that, when executed by the processor, cause the frequency converter to:
identify a parameter of the rotating electrical machine using electrical quantities, the identified parameter being used in the frequency converter and being identified in a first operating point;
provide an electro-mechanical model of the rotating electrical machine, the electro-mechanical model including a geometry of the machine and information of the construction material of the machine;
calculate, when a processor capacity of the frequency converter is available, a state of the rotating electrical machine in the first operating point using a finite element method with the electro-mechanical model of the rotating electrical machine;
calculate, when the processor capacity of the frequency converter is available, a state of the rotating electrical machine in a selected operating point using the finite element method with the electro-mechanical model of the rotating electrical machine;
correct the calculated state of the rotating electrical machine of a selected operating point using the identified parameter and the calculated state in the first operating point;
calculate, from the corrected state of the rotating electrical machine, at least one parameter of the electrical machine to be used in the frequency converter; and
control the operation of the frequency converter to drive the electrical rotating machine with the calculated at least one parameter.

* * * * *